(12) United States Patent
Menendez

(10) Patent No.: US 6,698,155 B2
(45) Date of Patent: Mar. 2, 2004

(54) BUILDING ELEMENTS AND BUILDING ELEMENT ASSEMBLIES FORMED THEREWITH

(76) Inventor: Jose Miguel Menendez, 50 Piso Av. Boyaca, Mariperez, Caracas (VE)

( * ) Notice: Subject to any disclaimer, the term of this patent is extended or adjusted under 35 U.S.C. 154(b) by 16 days.

(21) Appl. No.: 09/774,604

(22) Filed: Feb. 1, 2001

(65) Prior Publication Data

US 2001/0004825 A1 Jun. 28, 2001

Related U.S. Application Data

(63) Continuation-in-part of application No. 09/472,423, filed on Dec. 27, 1999, now abandoned.

(51) Int. Cl.$^7$ ................................................ E04C 3/07
(52) U.S. Cl. .................... 52/731.7; 52/720.1; 52/729.5; 52/731.2
(58) Field of Search ............................ 52/720.1, 729.3, 52/729.5, 731.7, 731.8, 731.9, 733.2, 739.1, 735.1, 733.4, 732.1, 731.2; 428/595, 599, 603

(56) References Cited

U.S. PATENT DOCUMENTS

| | | | |
|---|---|---|---|
| 2,082,792 A | | 6/1937 | Dean |
| 2,121,037 A | * | 6/1938 | Kotrbaty .................... 52/731.9 |
| 2,125,690 A | | 8/1938 | Ragsdale et al. |
| 2,508,032 A | | 5/1950 | Kennedy |
| 2,975,874 A | | 3/1961 | Pagan |
| 3,280,530 A | * | 10/1966 | Rothenbach ................ 52/731.2 |
| 3,359,022 A | * | 12/1967 | Russell ....................... 52/733.4 |
| 3,722,473 A | | 3/1973 | Vickstrom et al. |
| 3,977,149 A | | 8/1976 | Haynes et al. |
| 4,002,000 A | | 1/1977 | Howard et al. |
| 4,109,440 A | | 8/1978 | Bill |
| 4,663,906 A | | 5/1987 | Weinar |
| 4,854,107 A | | 8/1989 | Roberts |
| 5,464,302 A | | 11/1995 | Menchetti |
| 5,771,653 A | * | 6/1998 | Dolati et al. ................ 52/732.1 |
| 5,970,678 A | * | 10/1999 | Pellock et al. ............. 52/731.2 |

* cited by examiner

Primary Examiner—Michael Safavi

(57) ABSTRACT

A building element for use as a column or a beam includes a profile of substantially uniform cross-section extending lengthwise between first and second ends. The profile is defined by a web, a pair of side flanges perpendicular to the web, and curved outer corners joining the side flanges, respectively, to the web. The web includes at least one constriction extending in the same direction as the side flanges and having a pair of arms extending angularly inwardly toward one another from curved inner corners of the web to a curved base having an apex. The side flanges extend from the outer corners to tips, respectively, terminating at side edges, respectively. The building element has an overall width between the web and the tips. The at least one constriction has a width between the web and the apex about ⅓ the overall width. A plurality of the building elements can be assembled in web-to-web relation and/or tip-to-tip relation to obtain various building element assemblies useable as beam assemblies or column assemblies.

11 Claims, 7 Drawing Sheets

BUILDING ELEMENTS AND BUILDING ELEMENT ASSEMBLIES FORMED THEREWITH

CROSS REFERENCE TO RELATED PATENT APPLICATION

This application is a continuation-in-part of prior U.S. patent application Ser. No. 09/472,423, filed Dec. 27, 1999, now abandoned, the disclosure of which is incorporated herein by reference.

BACKGROUND OF THE INVENTION

1. Field of the Invention

The present invention relates to building elements such as columns and beams and, more particularly, to metal building elements having side flanges extending from webs formed with constrictions and to building element assemblies formed therewith.

2. Brief Discussion of the Related Art

Metal sheets can be formed via a cold folding process into various irregular shapes or profiles. Cold folding of metal sheets typically involves two-dimensional deformation of the metal sheets. The folding that can be effected from plastic deformation of metal sheets in a cold folding process is preferable to other currently existing metal shaping or forming processes, such as a sealing press or a deep drawing press, since it allows a greater variety of shapes or profiles to be obtained, including a great variety of irregular shapes or profiles. A variety of shapes or profiles can be successfully obtained with metal sheets via a cold folding process where b/s >5, with s being the thickness of the sheet and b being the length of the sheet.

Metal sheets have been cold folded into shapes or profiles of great variety and high quality using sheet folding machines, as has been accomplished in the construction and steel industries, in the shipbuilding industry, in small and medium-sized industries and even in handicraft workshops. Considering this diversity, the publication by Siebel and Beisswanger of their studies of pressing, and the calculations performed by the Forschungsgesellschaft Blechverarbeitung (Society for Research on Sheet Production), it seems appropriate to view cold folding not just as a process but also as the sheet folding machine=s contribution to the demand for specific profiles.

In the area of construction, building elements made from shaped metal sheets have been assembled to form structural beams and columns for use as permanent supports in buildings or similar structures. Building elements having various irregular shapes or profiles have been used, including those having side flanges extending from webs formed with constrictions as represented by U.S. Pat. Nos. 2,082,792 to Dean, 2,125,690 to Ragsdale et al, 2,508,032 to Kennedy, 2,975,874 to Pagan, 4,109,440 to Bill and 5,464,302 to Menchetti. The constrictions extend from the webs about the same distance as the side flanges (Dean and Kennedy), about half the distance of the side flanges (Ragsdale et al and Menchetti), considerably less than one-third the distance of the side flanges (Pagan) or greater than the distance of the side flanges (Bill). In many of the building elements, the constrictions do not have rounded or curved corners. Furthermore, the height of the constrictions is either considerably large in proportion to the overall height of the building elements, as represented by Dean, Ragsdale et al, Kennedy, Bill and Menchetti, or is considerably small in proportion to the overall height of the building elements, as represented by Pagan.

Components made from shaped metal sheets have been proposed as supports for purposes other than buildings or similar structures. U.S. Pat. No. 3,977,149 to Haynes et al, for example, illustrates shaped metal components assembled as a form for poured concrete. U.S. Pat. No. 4,002,000 to Howard et al discloses shaped metal components assembled to form beams used in storage or pallet racks. The components of Haynes et al and Howard et al include constrictions formed in the webs thereof; however, the components are not designed to withstand the same loads as structural beams or columns used in buildings or similar structures. The constrictions disclosed by Haynes et al extend from the webs about the same distance as the side flanges and do not have rounded corners. The constriction disclosed by Howard et al forms the entire web, and the height of the constriction is considerably large in proportion to the overall height of the component.

Conventional shaped metal building elements possess numerous disadvantages including the inability to be used individually as beams and/or columns, the need for extraneous components or parts in order to assemble the building elements to form structural members such as beams and columns, the need for additional components or parts to impart stability and/or rigidity to the building elements, the inability to resist high compression, traction and tension, the constrictions being either too large or too small to achieve optimum strength and rigidity, the building elements not being lightweight, and complexity in manufacture and assembly resulting in high construction costs.

OBJECTS AND SUMMARY OF THE INVENTION

Accordingly, it is a primary object of the present invention to overcome the aforementioned disadvantages of prior art shaped metal building elements. Another object of the present invention is to provide shaped metal building elements usable individually as beams and/or columns or in combination to form beam and/or column assemblies.

An additional object of the present invention is to provide a shaped metal building element having a geometric profile presenting increased resistance to compression, traction and tension.

A further object of the present invention is to increase the loading capacity of a standard structural steel member by forming a constriction in the web of the standard structural steel member.

The present invention also has as an object to provide a plurality of shaped metal building elements capable of being assembled in various ways to form various beam and/or column assemblies.

It is also an object of the present invention to increase the loading capacity of a shaped metal building element by forming protrusions in the side flanges of the building element.

Yet another object of the present invention is to utilize a cold folding process to form a shaped metal building element having side flanges extending from a web formed with at least one constriction having rounded corners.

The aforesaid objects are achieved individually and in combination, and it is not intended that the present invention be construed as requiring two or more of the objects to be combined.

Some of the advantages of the present invention are that the building elements have greater rigidity and stability, the building elements can be of any desired length, the building elements can be manufactured automatically such as with high capacity shaping rods, the building elements have an optimum resistance-to-weight ratio, the building elements are lighter than conventional shaped metal building elements, the building elements and the building element assemblies formed therewith comply with current antiseismic and structural steel regulations, displacements caused by seismic loads are limited or controlled due to the moment of inertia characteristics of the building elements, the number, shape, and size of the constrictions can be varied in proportion with the overall height and width of the building elements and in accordance with the particular architectural design and structural loading requirements for buildings or other similar structures in which the building elements are used, plural building elements can be assembled in a manner to accommodate construction components such as electrical wiring or cables and/or plumbing, the building elements can be shaped so as to provide a mechanical joint or connector facilitating connection with other building elements and/or with other structural members such as wall, floor, ceiling and window structures, the building elements can be reasonably priced, construction waste is minimized and construction costs are reduced.

These and other objects, advantages and benefits are realized with the present invention as generally characterized in a building element for use as a beam or a column and including a profile of substantially uniform cross-section extending lengthwise between first and second ends. The profile is defined by a web, a pair of side flanges extending perpendicular to the web and curved outer corners joining the side flanges, respectively, to the web. The web includes at least one constriction extending in the same direction as the side flanges and having a pair of arms extending angularly inwardly toward one another from curved inner corners of the web to a curved base having an apex. The side flanges extend from the outer corners to tips, respectively, terminating at side edges, respectively. The building element has an overall width between the web and the tips and the at least one constriction has a width between the web and the apex that is about ⅓ the overall width. The web may include planar segments between the outer and inner corners. The web may include a plurality of constrictions, and may include planar segments between the constrictions. Where the web includes a plurality of constrictions, the inner corners of each constriction may be joined to the inner corners of adjacent constrictions and/or the outer corners may be joined to corresponding inner corners. The side flanges may include protrusions therein, and the protrusions may extend outwardly or inwardly. The tips may be curved outwardly away from one another or inwardly toward one another.

A building element assembly according to the present invention is generally characterized by at least a first building element and a second building element assembled in web-to-web relation. Another building element assembly according to the present invention is generally characterized by at least a first building element and a second building element assembled in tip-to-tip relation. The building element assemblies are usable as beam assemblies or column assemblies. Various additional building elements can be assembled to the first and second building elements of the building element assemblies to obtain various diverse building element assemblies. Where the first and second building elements are assembled in tip-to-tip relation, the tips of the first and second building elements are in abutment, and the side edges may be in abutment. Where the first and second building elements are assembled in web-to-web relation, one or both of the first and second building elements may be used as a mechanical joint or connector for another structural member such as a wall structure, a floor structure, a ceiling structure, and/or a window structure. Where the first and second building elements are assembled in web-to-web relation and have outwardly curved tips, the first and second building elements together form a mechanical joint or connector for another structural member.

Other objects and advantages of the present invention will become apparent from the following description of the preferred embodiments taken in conjunction with the accompanying drawings, wherein like parts in each of the several figures are identified by the same reference characters.

DESCRIPTION OF THE PREFERRED EMBODIMENTS

Figure 1:
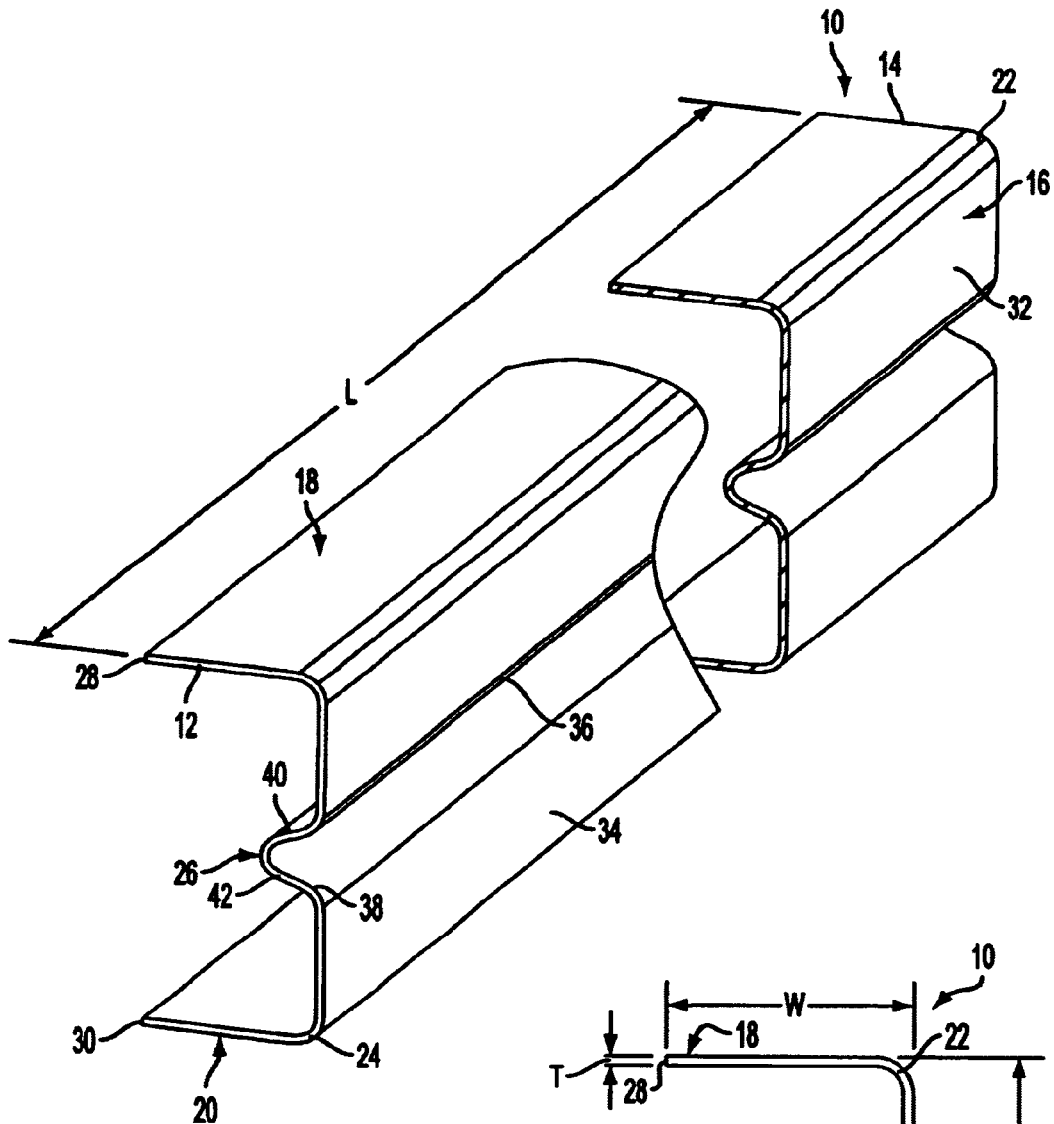
FIG. 1 is a broken perspective view of a building element according to the present invention.
Figure 2:
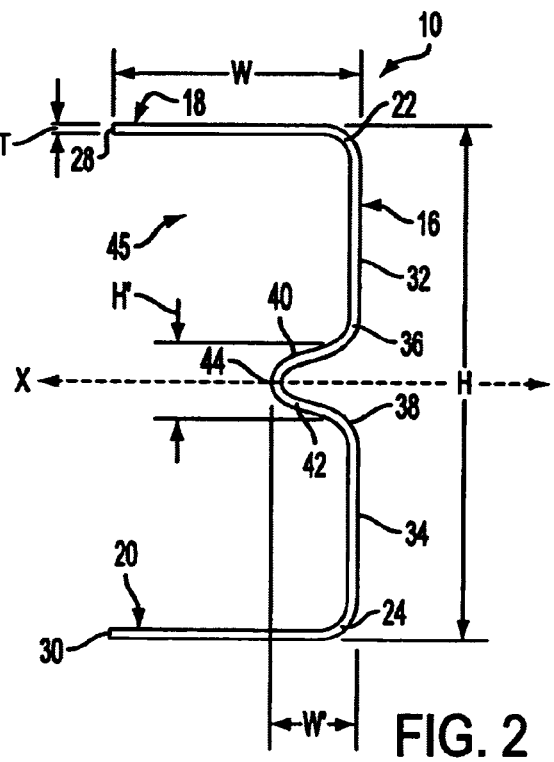
FIG. 2 is an end view of the building element of FIG. 1.

A building element 10 according to the present invention is illustrated in FIGS. 1 and 2. The building element 10 is made of metal and has a generally E-shaped profile in end and cross-sectional view. The profile is uniform or substantially uniform in cross-section along a length L of the building element defined between first and second ends 12 and 14. The profile has a uniform or substantially uniform thickness T and is defined by a web 16, first and second side flanges 18 and 20 extending perpendicular to web 16 in the same direction, first and second outer corners 22 and 24 joining the first and second side flanges, respectively, to the web 16, and a constriction 26 in web 16 extending in the same direction as the first and second side flanges. The side flanges 18, 20 are bent or folded at a right angle to web 16 and extend from outer corners 22 and 24, respectively, to the left in FIGS. 1 and 2, to tips of the side flanges terminating at first and second side edges 28 and 30, respectively. The side flanges 18 and 20 are parallel to one another and extend from outer corners 22 and 24, respectively, the same distance. The outer corners 22 and 24 are curved, arcuate, radiused or rounded and extend between first and second planar segments 32 and 34 of web 16 and the side flanges 18 and 20, respectively, which include planar portions, respectively. In the case of building element 10, the side flanges 18 and 20 are planar between outer corners 22 and 24 and side edges 28 and 30, respectively, so that the planar segments include the tips of the side flanges, respectively.

The web 16 includes constriction 26, planar segments 32 and 34 on opposite sides of constriction 26 and first and second inner corners 36 and 38 extending between constriction 26 and the first and second planar segments 32 and 34, respectively. The constriction 26 is centrally located in web 16 and, therefore, is centrally located between side flanges 18 and 20. The constriction 26 has a generally V-shaped configuration with first and second arms 40 and 42 extending angularly outwardly from a base to the first and second inner corners 36 and 38, respectively. The base 44 is curved, arcuate, radiused or rounded, and the apex thereof is coincident with a central axis X of the building element 10, the central axis X being perpendicular to the planar segments 32 and 34. The constriction 26 is symmetrical about the central axis X, and the entire building element 10 is also symmetrical about the central axis X. The inner corners 36 and 38 are curved, arcuate, radiused or rounded between planar segments 32 and 34 and arms 40 and 42, respectively.

The profile defined by building element 10 has an overall height H between outer faces or surfaces of side flanges 18 and 20, respectively, as shown in FIG. 2. In the case of building element 10, the overall height H is defined between parallel planes containing outer surfaces of the planar portions of side flanges 18 and 20, respectively. The building element 10 has an overall width W between a plane containing the side edges 28 and 30 and a plane containing outer faces or surfaces of both planar segments 32 and 34. The constriction 26 extends the entire length L of the building element 10 between the first and second ends 12 and 14 and has a width W' between the plane containing the outer faces or surfaces of the planar segments 32 and 34 and a plane containing the apex of base 44 as shown in FIG. 2. Arms 40 and 42 of constriction 26 are connected to the inner corners 36 and 38 at junctions, respectively. The constriction 26 has a height H' defined by the perpendicular distance between the junctions as shown in FIG. 2. The building element 10 defines an interior cavity 45 that is open between the side flanges 18 and 20. The cavity 45 is capable of receiving or accommodating various structural members or construction components as explained further below.

The apex of base 44 is spaced from the planar segments 32 and 34 about one-third the distance that the side edges 28 and 30 are spaced from the planar segments; and, accordingly, the width W' of the constriction is about one-third the overall width W of the building element. The width W' of the constriction is about the same as or slightly greater than the height H' of the constriction. The width W' of the constriction is no greater than one-fourth the overall height H of the building element. In one preferred embodiment, the width W' of the constriction is about one-sixth the overall height H of the building element, and the overall width W of the building element is slightly less than one-half the overall height H. In a preferred embodiment, the constriction has a height H' between the junctions no greater than ¼ the overall height H, and preferably the height H' of the constriction is about ⅙ the overall height H. The radius of curvature for outer corners 22 and 24 is less than the radius of curvature for inner corners 36 and 38. The radius of curvature for base 44 is less than the radius of curvature for outer corners 22 and 24. Preferably, the building element 10 is formed by a cold folding process involving plastic deformation of the metal. The building element 10 can be manufactured automatically using high capacity shaping rods.

The profile defined by building element 10 renders it greatly resistant to compression, traction and tension. The constriction 26 is optimal because its length-to-width ratio enables it to resist greater compression. The shape, location and proportions of the constriction provide considerable advantages in load capacity, stability and integrity. The building element 10 can be used individually as a beam or column and can be assembled or combined with other building elements according to the present invention to form various building element assemblies usable as beam and column assemblies as explained further below. The building element 10 and the assemblies obtained therewith are lighter in weight than conventional building elements, typically between ten and thirty percent lighter. The building element 10 and the beam and/or column assemblies formed therewith comply with current anti-seismic and structural steel regulations. The moment of inertia characteristics of the building element 10 limits displacements caused by seismic loads.

Figure 3A:
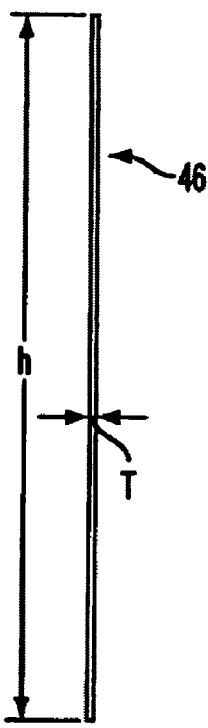
FIG. 3A is an end view of a metal sheet capable of being formed into the building element of FIG. 1.
Figure 3B:
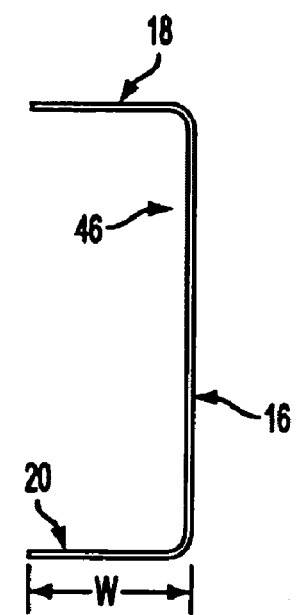
FIG. 3B is an end view of the metal sheet formed to define a web and side flanges extending from the web.
Figure 3C:
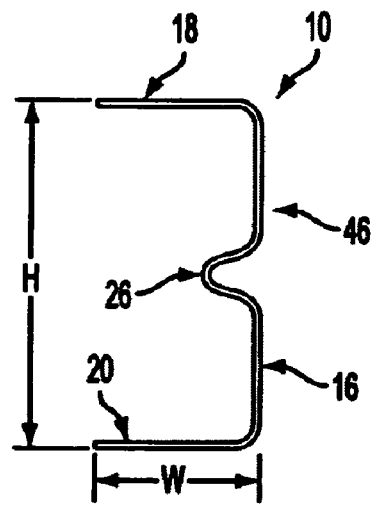
FIG. 3C is an end view of the metal sheet formed to define a constriction in the web.

FIGS. 3A–3C are representative of a procedure for forming building element 10 from a metal sheet 46. With reference to FIG. 3A, the metal sheet 46 is seen to have an overall height h and a uniform or substantially uniform thickness T. The metal sheet 46 can be of any suitable length between the first and second ends thereof. As shown in FIG. 3B, outer portions of the sheet 46 are bent or folded from a middle or central portion thereof in the same direction to form a C-shaped profile. The C-shaped profile defined by sheet 46 at this stage includes web 16 and side flanges 18 and 20 extending from web 16. The C-shaped profile has an overall width W corresponding to the overall width of the finally formed building element. The constriction 26 is formed in web 16 by bending or folding as represented in FIG. 3C. The building element 10 is thereby finally formed with the resulting E-shaped profile having the overall height H. Accordingly, the metal sheet 46 from which the building element 10 can be formed has an overall height h greater than the overall height H of the finally formed building element 10 to account for bending of the sheet to form side flanges 18 and 20 and bending of the web 16 to form constriction 26.

Figure 4A:
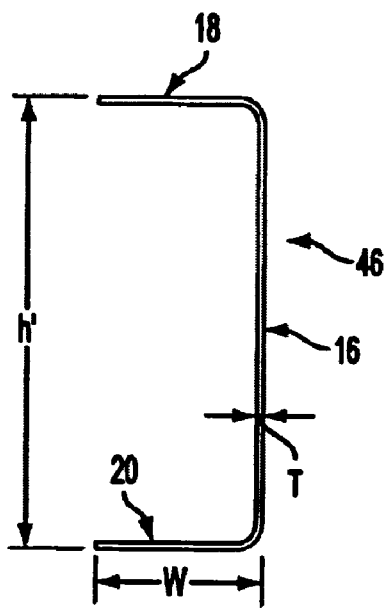
FIG. 4A is an end view of a conventional structural steel member capable of being formed into the building element of FIG. 1.
Figure 4B:
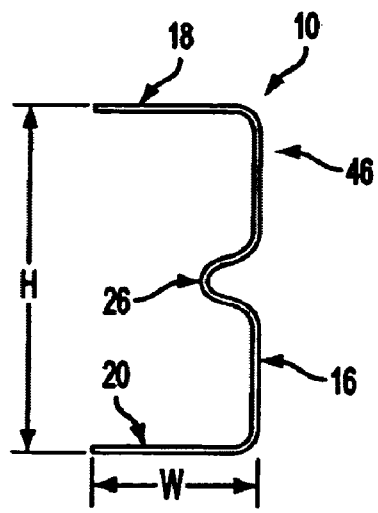
FIG. 4B is an end view of the conventional structural steel member formed to define a constriction in the web thereof.

FIGS. 4A and 4B are representative of a process for forming the building element 10 from a standard structural steel member 48. The structural steel member 48 has a C-shaped profile defining a web 16 and side flanges 18 and 20 extending from web 16. An exemplary structural steel member is an ASTM 46-79b Type C structural member. The structural steel member 48 has an initial overall height h greater than the overall height desired for the building element 10 to be formed therewith, an overall width W corresponding to the overall width desired for the building element 10 and a uniform or substantially uniform thickness T. Also, the structural steel member 48 has a length between first and second ends thereof corresponding to the length desired for the building element 10. In order to form the building element 10 from the structural steel member 48, the web 16 thereof is bent or folded to form constriction 26 therein as shown in FIG. 4B. The building element 10 is thusly formed having the E-shaped profile with an overall height H smaller than the initial height h of the structural steel member 48.

Figure 5:
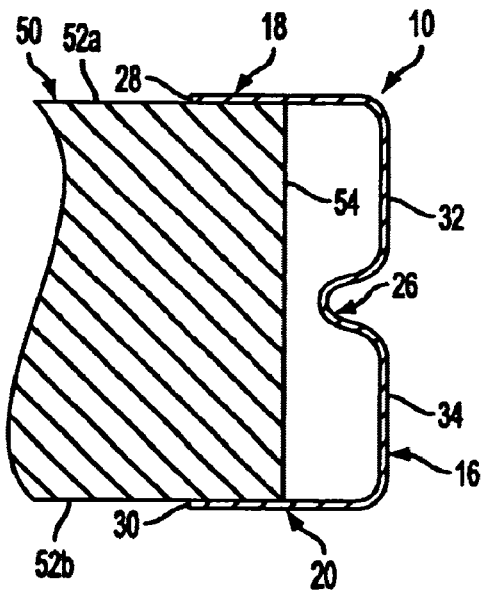
FIG. 5 is a broken, sectional top view illustrating use of the building element of FIG. 1 as a column with a wall structure disposed between the side flanges of the building element.

FIG. 5 illustrates use of building element 10 individually as a column and as a mechanical joint or connector for another structural member. When used as a column, the building element 10 typically extends vertically in the building or other structure in which it is installed, as represented in FIG. 5 by a sectional top view of the building element. FIG. 5 illustrates a wall structure 50, which also typically extends vertically, disposed in cavity 45 between the side flanges 18 and 20 of building element 10. The wall structure 50 has parallel outer faces 52a and 52b and a side or end face 54 extending between the outer faces 52a and 52b. The wall structure 50 is disposed between the side flanges 18 and 20 with the side or end face 54 located between constriction 26 and tips 28 and 30, and with the side flanges 18 and 20 overlapping and abutting the outer faces 52a and 52b, respectively. In the arrangement illustrated in FIG. 5, the side face 54 is located approximately midway between the side edges 28 and 30 and the planar segments 32 and 34 such that the side face 54 is spaced a short distance from the base 44 of constriction 26 and, therefore, does not contact the constriction 26. It should be appreciated, however, that the side face 54 can be located various distances from the constriction 26 and can abut the constriction 26. The building element 10 can be secured to the wall structure 50 in various diverse ways depending on the construction and/or materials of the wall structure 50. For example, suitable fasteners (not shown) can be inserted through the side flanges 18 and 20, respectively, and into the wall structure 50. The building element 10 can be assembled to various types of wall structures 50 including conventional panel, brick or block wall structures. In addition to wall structures, the building element 10 can be used as a mechanical joint or connector for other types of structural members including floor structures, ceiling structures and windows, for example. Also, the cavity 45 can be used to accommodate various construction components such as electrical wiring and plumbing, for example. The building element 10 can also be used individually as a beam as described further below. The building element 10 can be used individually as a beam or column without a structural member or construction components received in the cavity.

Figure 6:
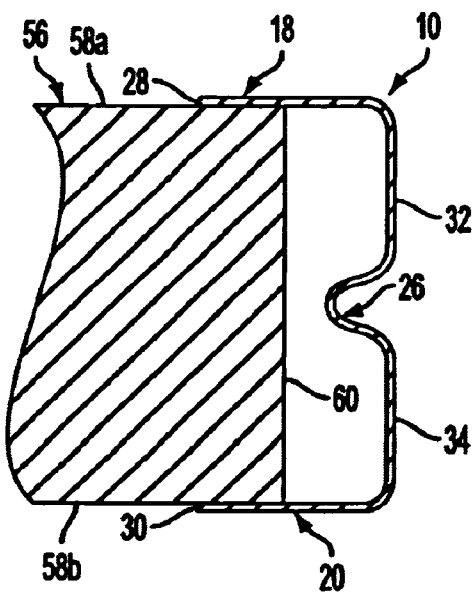
FIG. 6 is a broken, sectional end view illustrating use of the building element of FIG. 1 as a beam with a floor structure disposed between the side flanges of the building element.

Use of building element 10 individually as a beam and as a mechanical joint or connector for a floor structure is illustrated in FIG. 6. When used as a beam, the building element 10 typically extends horizontally in the building or other structure in which it is installed, as represented in FIG. 6 by a sectional end or side view of the building element. A floor structure 56, which also typically extends horizontally, is disposed in cavity 45 between the side flanges 18 and 20. The floor structure 56 has a parallel outer faces 58a and 58b and a side or end face 60 extending between the outer faces 58a and 58b. The floor structure 56 is disposed between the side flanges 18 and 20 with the side flanges 18 and 20 overlapping and abutting the outer faces 58a and 58b, respectively, and with the side face 60 disposed about midway between planar segments 32 and 34 and side edges 28 and 30 such that the side face 60 is spaced from the constriction 26 a short distance. Of course, the distance between the side face 60 and the constriction 26 can vary, and the side face 60 can abut the constriction. The building element 10 can be connected or secured to the floor structure 56, such as via connectors or fasteners inserted through the side flanges 18 and 20 and into the floor structure 56. In a similar manner, the building element 10 can receive and be secured to a horizontally extending ceiling structure.

Figure 7:
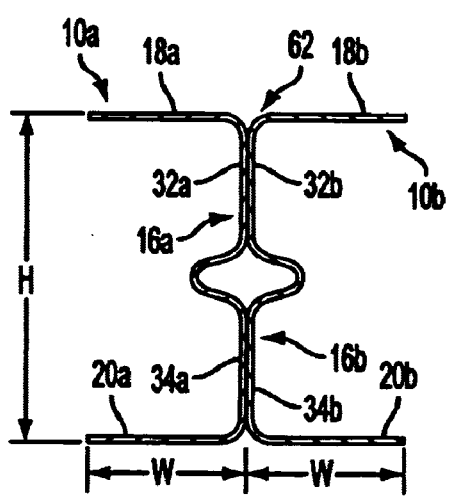
FIG. 7 is a sectional view illustrating assembly of two of the building elements of FIG. 1 in web-to-web relation to form a building element assembly usable as a column or beam assembly.

FIG. 7 illustrates two building elements 10a and 10b assembled in web-to-web relation to form a building element assembly 62 for use as a column or beam assembly. In the building element assembly 62, first and second building elements 10a and 10b, which are the same as building element 10, are assembled and secured in position with their webs 16a and 16b in abutment and, in particular, with the planar segments of webs 16a and 16b in abutment. The planar segment 32a of the first building element 10a is in abutment with the planar segment 32b of the second building element 10b. The planar segment 34a of the first building element 10a is in abutment with the planar segment 34b of the second building element 10b. Accordingly, the side flanges 18a and 20a of the first building element 10a extend in a first direction, i.e. to the left, while the side flanges 18b and 20b of the second building element 10b extend in a second, opposite direction, i.e. to the right, looking at FIG. 7. The building element assembly 62 has an overall height corresponding to the overall height H of the first and second building elements 10a and 10b and an overall width corresponding to the combined overall widths W of the first and second building elements 10a and 10b. The first and second building elements 10a and 10b can be secured in position in web-to-web relation in various ways including securement or attachment of the first and second building elements to one another, such as by welding.

When used as a column assembly, the building element assembly 62 will typically be oriented vertically in the building or other structure in which it is installed, in which case FIG. 7 may be considered a sectional top view. When used as a beam assembly, the building element assembly 62 will typically be oriented horizontally in the building or other structure in which it is installed, in which case FIG. 7 may be considered a sectional end or side view. Of course, the building element assembly 62 can be used as a mechanical joint or connector for one or more structural members, such as wall, floor and ceiling structures as well as windows. For example, a first structural member can be disposed in the cavity of the first building element 10a between the side flanges 18a and 20a, and a second or another structural member can be disposed in the cavity of the second building element 10b between the side flanges 18b and 20b. Accordingly, one or two structural members can be assembled to and connected with the building element assembly 62 in a manner similar to that described above.

Figure 8:
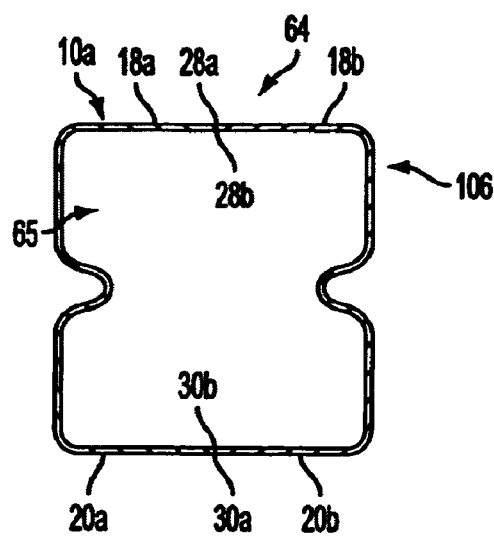
FIG. 8 is a sectional view illustrating assembly of two of the building elements of FIG. 1 in tip-to-tip relation to form an alternative building element assembly usable as a column or beam assembly.

FIG. 8 illustrates assembly of first and second building elements 10a and 10b in tip-to-tip or end-to-end relation to form an alternative building element assembly 64. In building element assembly 64, the first building element 10a has its first side edge 28a in abutment with the first side edge 28b of the second building element 10b. The first building element 10a has its second side edge 30a in abutment with the second side edge 30b of the second building element 10b. The side flanges 18a and 20a of the first building element 10a extend toward the right, and the side flanges 18b and 20b of the second building element 10 extend toward the left looking at FIG. 8. The overall height and the overall width for the building element assembly 64 are the same as those for building element assembly 62. The first and second building elements can be secured in position in tip-to-tip relation in various ways including securement or attachment of the first and second building elements to one another, such as by welding along the abutting side edges.

The building element assembly 64 can be used as a column assembly or as a beam assembly. When used as a column assembly, the building element assembly 64 will typically be oriented vertically in the building or other structure in which it is installed. When used as a beam assembly, building element assembly 64 will typically be oriented horizontally in the building or other structure in which it is installed. In the building element assembly 64, the first and second building elements enclose or circumscribe an interior space 65, which can be used to receive or accommodate various construction components such as electrical wiring and/or plumbing.

Figure 9:
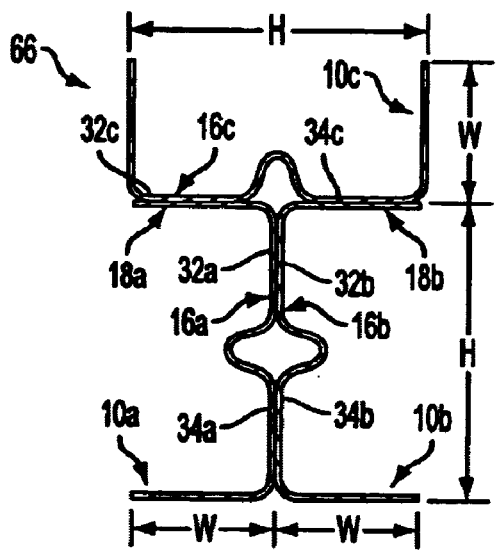
FIG. 9 is a sectional view illustrating assembly of three of the building elements of FIG. 1 to form another building element assembly usable as a column or beam assembly.

Another building element assembly 66 is illustrated in FIG. 9 and comprises first, second and third building elements 10a, 10b and 10c assembled together, the building elements 10a, 10b and 10c being the same as building element 10. In the building element assembly 66, the first and second building elements 10a and 10b are assembled in web-to-web relation as described for building element assembly 62. Accordingly, the planar segments 32a and 34a of the web 16a of the first building element 10a are in abutment with the planar segments 32b and 34b, respectively, of the web 16b of the second building element 10b. The third building element 10c is assembled to the first and second building elements 10a and 10b with the web 16c of the third building element 10c in abutment with the side flanges 18a and 18b of the first and second building elements 10a and 10b, respectively. In particular, the planar segment 32c of the web 16c is in abutment with the side flange 18a of the first building element 10a, and the planar segment 34c of the web 16c is in abutment with the side flange 18b of the second building element 10b. The third building element can be secured in position with the first and second building elements in various ways including securement or attachment of the third building element to the first and second building elements, such as by welding. The third building element 10c has an overall height H the same as or substantially the same as the combined widths W of the first and second building elements 10a and 10b. The building element assembly 66 has an overall width corresponding to the combined widths W of the first and second building elements 10a and 10b and also corresponding to the height H of the third building element 10c. The building element assembly 66 has an overall height corresponding to the overall height H of the first and second building elements 10a and 10b plus the overall width W of the third building element 10c.

The building element assembly 66 can be used as a beam assembly, typically oriented horizontally in the building or other structure in which it is installed, or a column assembly, typically oriented vertically in the building or other structure in which it is installed. In addition, the building element assembly 66 can be used as a mechanical joint or connector for one, two, or three structural members, such as wall structures, floor structures, ceiling structures and/or windows. For example, a first structural member can be disposed between the side flanges of the first building element 10a, a second structural member can be disposed between the side flanges of the second building element 10b and/or a third structural member can be disposed between the side flanges of the third building element 10c. Of course, the cavities defined by the individual building elements can remain vacant or can be used to accommodate various construction components such as electrical wiring and/or plumbing.

Figure 10:
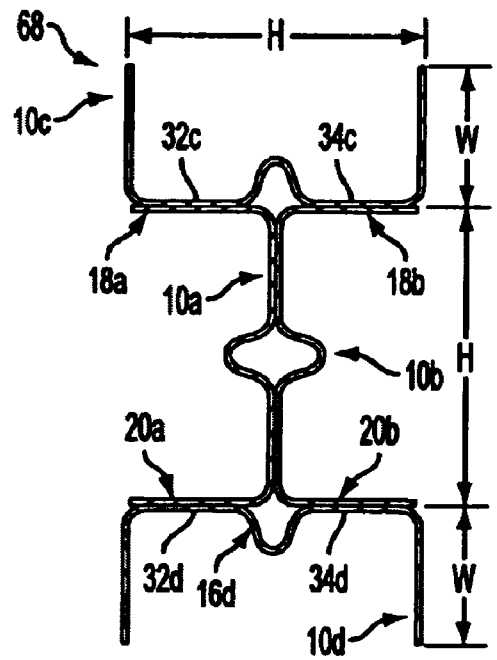
FIG. 10 is a sectional view illustrating assembly of four of the building elements of FIG. 1 to form a modified building element assembly usable as a column or beam assembly.

FIG. 10 depicts a building element assembly 68 formed by four building elements, i.e. first building element 10a, second building element 10b, third building element 10c and fourth building element 10d, all of which are similar to building element 10. The first, second and third building elements 10a, 10b and 10c are assembled as described for building element assembly 66 so that the planar segments 32c and 34c of the third building element 10c are in abutment with the side flanges 18a and 18b of the first and second building elements 10a and 10b, respectively. The fourth building element can be secured in position with the first, second and third building elements in various ways including securement or attachment of the fourth building element to the first and second building elements, such as by welding. The fourth building element 10d is assembled to the first and second building elements 10a and 10b with the planar segments 32d and 34d of its web 16d in abutment with the side flanges 20a and 20b of the first and second building elements 10a and 10b, respectively. The fourth building element 10d has an overall height the same as or substantially the same as the overall height H of the third building element 10c, and the building element assembly 68 has an overall width corresponding to the overall height H of the third building element 10c, which corresponds to the combined overall widths of the first and second building elements. The building element assembly 68 has an overall height corresponding to the overall height H of the first and second building elements 10a and 10b plus the overall widths W of the third and fourth building elements 10c and 10d. The building element assembly 68 can be used as a column assembly or as a beam assembly as discussed above. One or more of the cavities of the four building elements forming the building element assembly 68 can be used to receive or accommodate a structural member, such as a wall structure, floor structure, ceiling structure or a window, and/or various construction components such as wiring and/or plumbing. Accordingly, the building element assembly 68 can serve as a mechanical joint or connector for up to four structural members.

Figure 11:
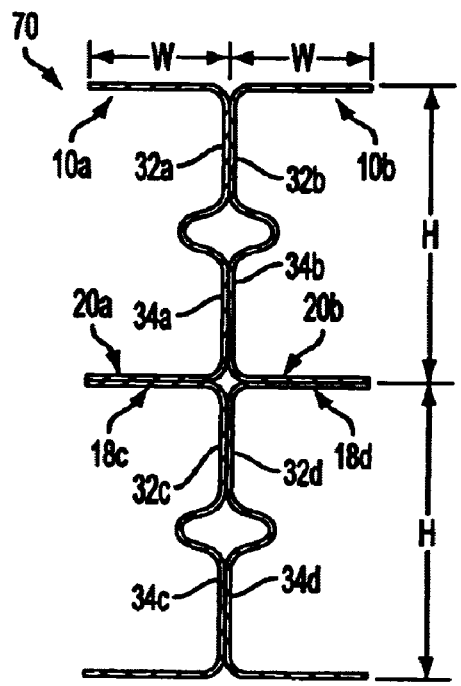
FIG. 11 is a sectional view illustrating an alternative assembly of four of the building elements of FIG. 1 to form yet another building element assembly usable as a column or beam assembly.

Another building element assembly 70 made up of five building elements 10a, 10b, 10c, 10d and 10e, which are similar to building element 10, is illustrated in FIG. 11. Building element assembly 70 has first and second building elements 10a and 10b assembled together in web-to-web relation with the planar segments 32a and 34a of the first building element 10a in abutment wit the planar segments 32b and 34b of the second building element 10b, respectively, as described for building element assembly 62. The third and fourth building elements 10c and 10d of building element assembly 70 are assembled together in web-to-web relation in the same manner as the first and second building elements thereof. Accordingly, planar segments 32c and 34c of the third building element 10c are in abutment with the planar segments 32d and 34d of the fourth building element 10d, respectively. The first and second building elements 10a and 10b are assembled to the third and fourth building elements 10c and 10d with the side flange 20a of the first building element 10a in abutment with the side flange 18c of the third building element 10c and the side flange 20b of the second building element 10b in abutment with the side flange 18d of the fourth building element 10d. The first and second building elements can be secured in position with the third and fourth building elements in various ways including securement or attachment of the first and second building elements to the third and fourth building elements such as by welding. The building element assembly 70 has an overall width corresponding to the combined overall widths W of the first and second building elements 10a and 10b, which is the same as or substantially the same as the combined overall widths of the third and fourth building elements 10c and 10d. The building element assembly 70 has an overall height corresponding to the overall height H of the first and second building elements 10a and 10b plus the overall height H of the third and fourth building elements 10c and 10d. The building element assembly 70 can be used as a beam assembly or as a column assembly as explained above. One or more of the cavities of the four building elements making up the building element assembly 70 can be used to receive or accommodate a structural member and/or various construction components as discussed above.

Figure 12:
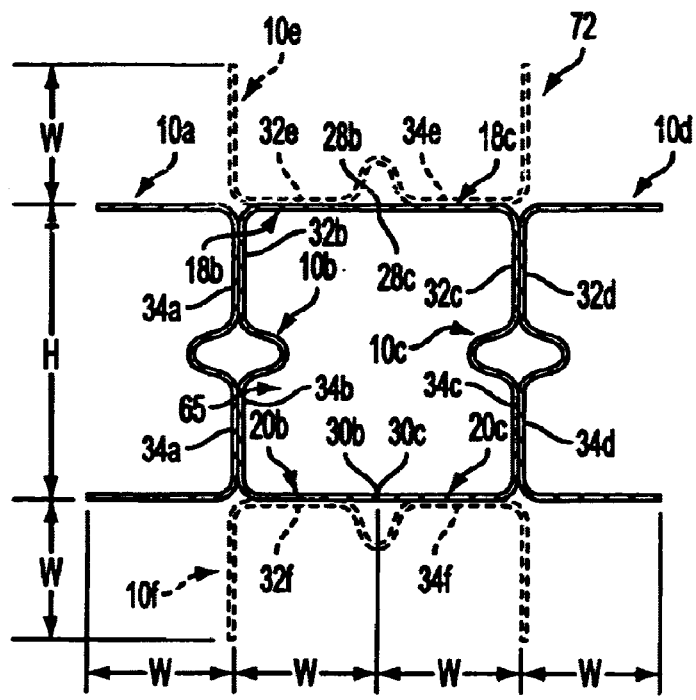
FIG. 12 is a sectional view illustrating assembly of three, four or five of the building elements of FIG. 1 to form further alternative building element assemblies usable as column or beam assemblies.

FIG. 12 illustrates a building element assembly 72 made up of four, five or six building elements. Building element assembly 72 includes first and second building elements 10a and 10b, similar to building element 10, assembled together in web-to-web relation, and second and third building elements 10c and 10d, similar to building element 10, also assembled in web-to-web relation as described for building element assembly 62. Accordingly, the planar segments 32a and 34a of the first building element 10a are in abutment with the planar segments 32b and 34b of the second building element 10b, respectively, and the planar segments 32c and 34c of the third building element 10c are in abutment with the planar segments 32d and 34d of the fourth building element, respectively. The third and fourth building elements 10c and 10d are assembled to the first and second building elements 10a and 10b with the second building element 10b in tip-to-tip relation with the third building element 10c. Accordingly, the side edges 28b and 30b of the second building element 10b are in abutment with the side edges 28c and 30c of the third building element 10c, respectively. The third and fourth building elements can be secured in position with the first and second building elements in various ways including securement or attachment of the second building element to the third building element such as by welding along the side edges 28b, 30b, 38c and 30c. The first, second, third and fourth building elements 10a, 10b, 10c and 10d have an overall height H. The first, second, third and fourth building elements 10a, 10b 10c and 10d each have an overall width W.

A fifth building element 10e, shown in dotted lines, may be assembled to the second and third building elements with the planar segment 32e of the fifth building element 10e in abutment with the side flange 18b of the second building element 10b and the planar segment 34e of the fifth building element 10e in abutment with the side flange 18c of the third building element 10c. The fifth building element can be secured in position with the second and third building elements in various ways including securement or attachment of the fifth building element to the second and third building elements such as by welding. The fifth building element 10e has an overall height the same as or substantially the same as the combined widths W of the second and third building elements 10b and 10c and an overall width W the same as or substantially the same as the overall widths W of the first, second, third and fourth building elements.

A sixth building element 10f, shown in dotted lines, may be assembled to the second and third building elements 10b and 10c with the planar segment 32f of the sixth building element 10f in abutment with the side flange 20b of the second building element 10b and the planar segment 34f of the sixth building element 10f in abutment with the side flange 20c of the third building element 10c. The sixth building element can be secured in position with the second and third building elements in various ways including securement or attachment of the sixth building element to the second and third building elements such as by welding. The sixth building element 10f has an overall height the same as or substantially the same as the combined widths W of the second and third building elements 10b and 10c and an overall width W the same as or substantially the same as the overall widths W of the first, second, third and fourth building elements.

Where the building element assembly 72 is formed of the first, second, third and fourth building elements 10a, 10b, 10c and 10d, it has an overall height corresponding to the overall height H of the first, second, third and fourth building elements and an overall width corresponding to the combined widths, i.e. 4×W, of the first, second, third and fourth building elements. Where the building element assembly 72 is made up of the first, second, third, fourth and fifth building elements 10a, 10b, 10c, 10d and 10e, it has an overall height corresponding to the overall height H of the first, second, third and fourth building elements 10a, 10b, 10c and 10d plus the overall width W of the fifth building element 10e. Where the building element assembly 72 is made up of the first, second, third, fourth and fifth building elements, it has an overall width corresponding to the combined overall widths W of the first, second, third and fourth building elements. Where the building element assembly 70 is made up of six building elements 10*a*, 10*b*, 10*c*, 10*d*, 10*e* and 10*f*, it has an overall height corresponding to the overall height H of the first, second, third and fourth building elements 10*a*, 10*b*, 10*c* and 10*d* plus the combined overall widths W of the fifth and sixth building elements 10*e* and 10*f* and has an overall width corresponding to the combined widths, i.e. 4×W, of the first, second, third and fourth building elements. The space 65 circumscribed by the second and third building elements 10*b* and 10*c* can be used to receive or accommodate various building components. The cavities of the first and fourth building elements and the cavities of the fifth and sixth building elements, where provided, can be used to receive or accommodate various building components and/or can be used as mechanical joints or connectors for various structural members. The building element assembly 72 can be used as a beam assembly or as a column assembly as explained above.

Figure 13:
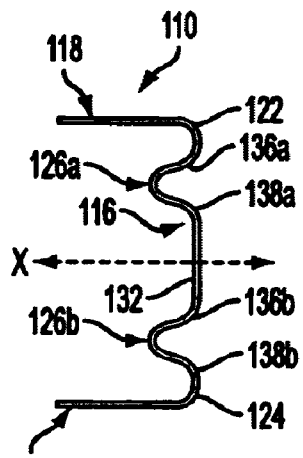
FIG. 13 is an end view of an alternative building element according to the present invention having two constrictions.

An alternative building element according to the present invention is illustrated at 110 in FIG. 13. The building element 110 is similar to building element 10 except that two constrictions 126*a* and 126*b* are formed in web 116 of building element 110. Building element 110 has first constriction 126*a* disposed midway between side flange 118 and the central axis X and second constriction 126*b* disposed midway between side flange 120 and the central axis X. Web 116 includes a single planar segment 132 between constrictions 126*a* and 126*b*. The arms of constriction 126*a*, which is similar to constriction 26, are joined to inner corners 136*a* and 138*a*, respectively. Inner corner 136*a* is joined to outer corner 122, and inner corner 138*a* is joined to planar segment 132. Constriction 126*b* is similar to constriction 126*a*, with the arms of constriction 126*b* joined to inner corners 136*b* and 138*b*, respectively. Inner corner 136*b* is joined to planar segment 132, and inner corner 138*b* is joined to outer corner 124. The apex of constriction 126*a* is located midway between the side flange 118 and the central axis X. The apex of constriction 126*b* is located midway between the side flange 120 and the central axis X. A center of the planar segment 132 is coincident with the central axis X. The inner corners 136*a* and 138*b* are joined to the outer corners 122 and 124, respectively, at junctions disposed in the same plane as planar segment 132. In other respects, the building element 110 is similar to building element 10. The building element 110 can be used individually as a beam or a column, or in combination with one or more other building elements in a building element assembly useable as a beam assembly or a column assembly as described above.

Figure 14:
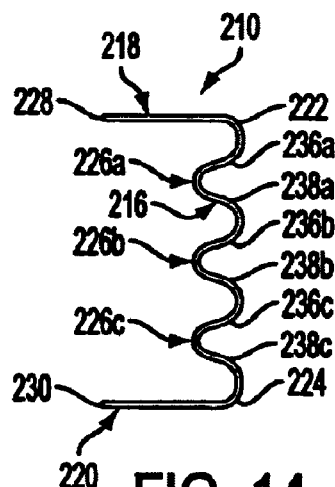
FIG. 14 is an end view of another alternative building element according to the present invention having three constrictions.

FIG. 14 illustrates another building element 210 similar to the building element 110 except that the building element 210 has three constrictions 226*a*, 226*b* and 226*c* formed in the web 216. Constrictions 226*a*, 226*b* and 226*c* are similar to constriction 26, with the apex of constriction 226*b* being coincident with the central axis of building element 210. Constriction 226*a* has its apex located midway between the central axis and the side flange 218. Constriction 226*c* has its apex located midway between the central axis and the side flange 220. First constriction 226*a* has its arms joined to inner corners 236*a* and 238*a*, respectively. Second constriction 226*b* has its arms joined to inner corners 236*b* and 238*b*, respectively. Third constriction 226*c* has its arms joined to inner corners 236*c* and 238*c*, respectively. The inner corner 236*a* is joined to the outer corner 222, and the inner corner 238*a* is joined to the inner corner 236*b*. The inner corner 238*b* is joined to the inner corner 236*c*. The inner corner 238*c* is joined to the outer corner 224, such that the web 216 does not have any planar segments. The inner corners 236*a* and 238*c* are joined to the outer corners 222 and 224, respectively, at junctions disposed in the same plane as the junctions defined where the inner corners 238*a* and 238*b* are joined to the inner corners 236*b* and 236*c*, respectively. In other respects, the building element 210 is similar to the building element 110. The building element 210 can be used individually as a beam or column, or in combination with one or more other building elements to form a building element assembly usable as a beam assembly or a column assembly.

Figure 15:
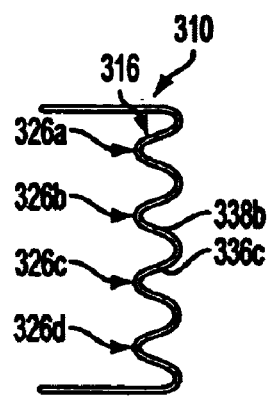
FIG. 15 is an end view of a further alternative building element according to the present invention having four constrictions.

Another building element 310 is illustrated in FIG. 15 and is similar to building element 210 except that the building element 310 has four constrictions 326*a*, 326*b*, 326*c* and 326*d* in web 316. Constrictions 326*a* and 326*b* are disposed on one side of the central axis for building element 310, and the constrictions 326*c* and 326*d* are disposed on the opposite side of the central axis. The junction at which the inner corners 338*b* and 336*c* are joined is coincident with the central axis. Each constriction 326*a*, 326*b*, 326*c* and 326*d* has an apex, the apexes being spaced from one another about the same distance.

Figure 16:
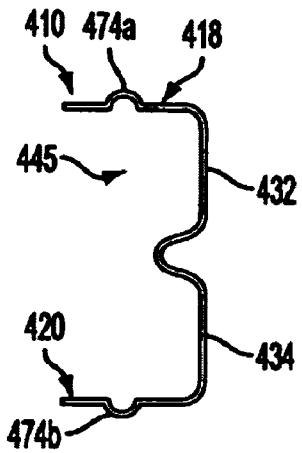
FIG. 16 is an end view of an additional alternative building element according to the present invention having outwardly extending protrusions in the side flanges thereof.

Another alternative building element is illustrated in FIG. 16 at 410. The building element 410 is similar to building element 10 except that side flanges 418 and 420 of building element 410 have outwardly extending protrusions 474*a* and 474*b*, respectively. Each protrusion is rounded, arcuate or curved having a convex, dome-shape or hemisphere configuration extending outwardly from the corresponding side flange in a direction away from the cavity 445 defined by the building element 410. The protrusions 474*a* and 474*b* extend the entire length of the building element 410 in a direction parallel to the plane containing the planar segments 432 and 434. Each protrusion 474*a* and 474*b* has an apex located a maximum distance outwardly of the corresponding side flange, and the apex of each protrusion is located about midway along the corresponding side flange. Accordingly, each protrusion 474*a* and 474*b* is disposed between planar portions of the corresponding side flange, and such planar portions are of the same or substantially the same width on opposite sides of the protrusion. The protrusions 474*a* and 474*b* can be formed in a manner similar to that described above for formation of the constrictions. The building element 410 can be made by forming or bending a metal sheet or by forming or bending a standard structural steel member as described above. The protrusions 474*a* and 474*b* provide increased load capacity for the building element 410, which can be used individually as a beam or a column or in combination with one or more other building elements in a building element assembly useable as beam or column assemblies as described above.

Figure 17:
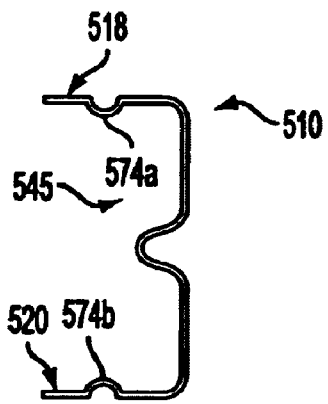
FIG. 17 is an end view of yet another alternative building element according to the present invention having inwardly extending protrusions in the side flanges thereof.

FIG. 17 illustrates another building element 510, which is similar to building element 410 except that the building element 510 has inwardly extending protrusions 574*a* and 574*b* in the side flanges 518 and 520 thereof. Protrusions 574*a* and 574*b* are similar to protrusions 474*a* and 474*b* except that the protrusions 574*a* and 574*b* extend or protrude inwardly into or toward the cavity 545 defined by the building element 510. Accordingly, the protrusions 574*a* and 574*b* have a concave configuration or profile. Each protrusion 574*a* and 574*b* has an apex located a maximum distance inwardly of the corresponding side flange, and the apex of each protrusion is located about midway along the corresponding side flange. The protrusions 574*a* and 574*b* impart increased load capacity to the building element 510, which can be used individually as a beam or a column or in combination with one or more other building elements in a building element assembly useable as a beam assembly or a column assembly.

Figure 18:
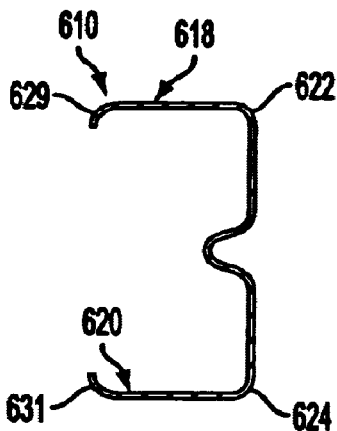
FIG. 18 is an end view of still another alternative building element according to the present invention having inwardly protruding tips.

Another building element is illustrated in FIG. 18 at 610 and is similar to building element 10 except that the tips of building element 610 are inwardly curved. The tips 629 and 631 of the building element 610 curve inwardly toward one another with the same or substantially the same radius of curvature as the outer corners 622 and 624, respectively. The curved tips 629 and 631 extend from planar portions of the side flanges 618 and 620, respectively, and are about the same length as the outer corners 622 and 624, respectively. The inwardly curved tips 629 and 631 provide a mechanical joint or connector facilitating assembly of a pair of the building elements 610 in tip-to-tip relation as explained further below.

Figure 19:
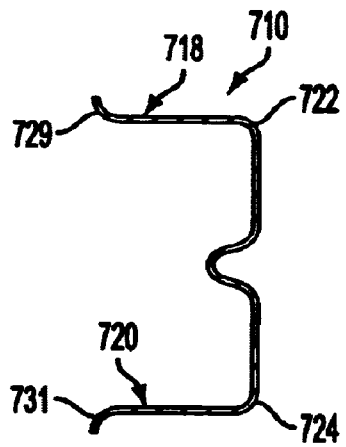
FIG. 19 is an end view of still a further alternative building element according to the present invention having outwardly protruding tips.

FIG. 19 illustrates another building element 710 that is similar to building element 610 except that the tips 729 and 731 of building element 710 curve outwardly. The tips 729 and 731 curve outwardly from planar portions of side flanges 718 and 720, respectively, in a direction away from one another and have a radius of curvature that is the same as or substantially the same as the radius of curvature of outer corners 722 and 724, respectively. However, the direction of curvature of tips 729 and 731 is reverse to that of outer corners 722 and 724, respectively. The tips 729 and 731 have a length about the same as the length of outer corners 722 and 724, respectively. The tips 729 and 731 provide a mechanical joint or connector facilitating assembly of a pair of building elements 710 in tip-to-tip relation. Also, when a pair of building elements 710 are assembled in web-to-web relation to form a building element assembly, the tips 729 of the building elements cooperate to form a first mechanical joint or connector for another structural member, and the tips 731 of the building elements cooperate to form a second mechanical joint or connector for another structural member as explained further below.

Figure 20:
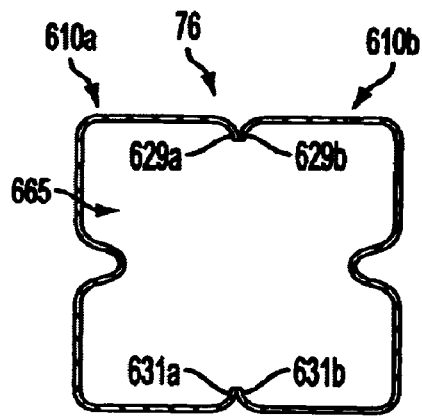
FIG. 20 is a sectional view illustrating assembly of two of the building elements of FIG. 18 in tip-to-tip relation to form an additional building element assembly usable as a column or beam assembly.

FIG. 20 illustrates a building element assembly 76 formed by first and second building elements 610a and 610b, which are the same as building element 610, assembled in tip-to-tip relation. The tips 629a and 631a of the first building element 610a are in abutment with the tips 629b and 631b, respectively, of the second building element 610b. Abutment of the building elements 610a and 610b along their tips facilitates connection or attachment of the building elements 610a and 610b to one another, such as by welding along the abutting tips. The building element assembly 76 can be used as a beam assembly or as a column assembly as explained above. The building element assembly 76 defines an interior space 665 which may accommodate various construction components as explained above.

Figure 21:
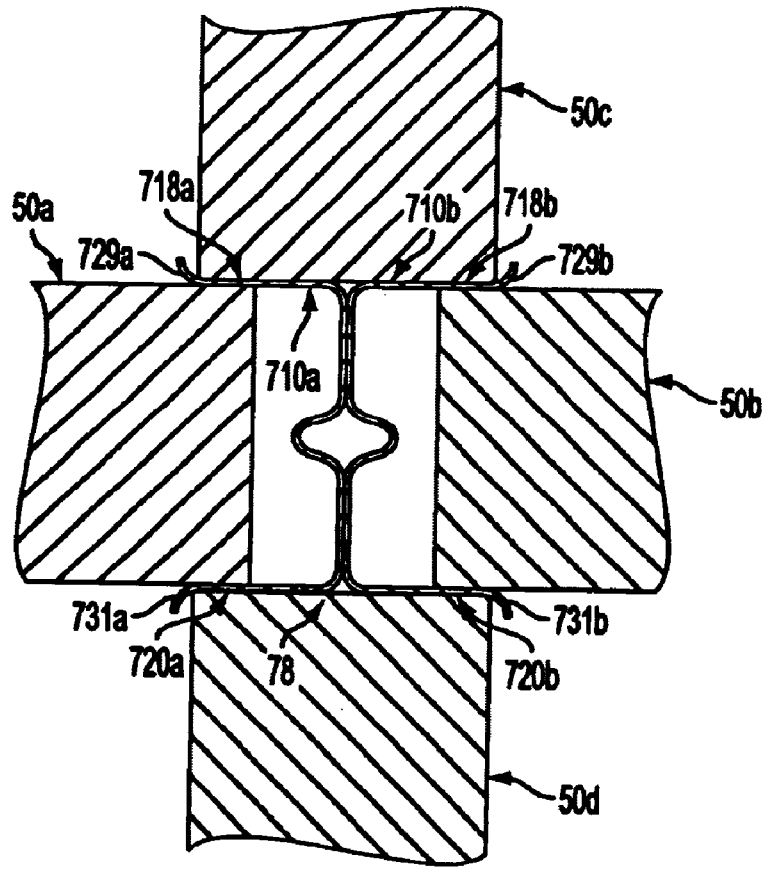
FIG. 21 is a broken top view illustrating assembly of two of the building elements of FIG. 19 in web-to-web relation to form still another building element assembly used as a column assembly for four wall structures.

FIG. 21 illustrates a building element assembly 78 used as a column assembly and formed of first and second building elements 710a and 710b, which are the same as building element 710, assembled in web-to-web relation. Also, the building element assembly 78 is shown used as a connector for four structural members. A first wall structure 50a is disposed in the cavity defined by first building element 710a between the side flanges 718a and 720a. A second wall structure 50b is disposed in the cavity defined by second building element 710b between side flanges 718b and 720b. The tips 729a and 729b form a mechanical joint or connector for a third structural member, and the tips 731a and 731b form a mechanical joint or connector for a fourth structural member. In particular, a third wall structure 50c is disposed between the tips 729a and 729b with an end surface of the third wall structure 50c in abutment with the side flanges 718a and 718b. A fourth wall structure 50d is disposed between the tips 731a and 731b with an end surface of the 718b. A fourth wall structure 50d is disposed between the tips 731a and 731b with an end surface of the fourth wall structure 10d in abutment with the side flanges 720a and 720b.

Figure 22:
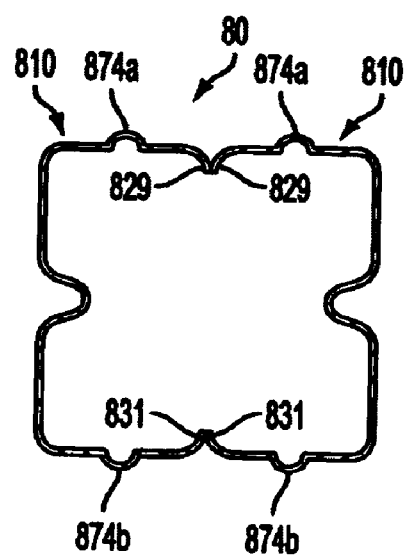
FIG. 22 is a sectional view illustrating another alternative building element according to the present invention having outwardly extending protrusions and inwardly protruding tips assembled in tip-to-tip relation with a like building element to form a further building element assembly usable as a column or beam assembly.

FIG. 22 illustrates a further building element 810 and also illustrates a building element assembly 80 formed by a pair of building elements 810 assembled to one another in tip-to-tip relation. The building element 810 has protrusions 874a and 874b and is similar to the building element 410 except that the building element 810 has inwardly curved tips 829 and 831. The tips 829 and 831 are the same as the tips 629 and 631, respectively. When the building elements 810 are assembled in tip-to-tip relation, the tips 829 and 831 of one building element 810 are in abutment with the tips 829 and 831 of the other building element 810. Building element assembly 80 can be used as a beam assembly or a column assembly. However, it should be appreciated that the building element 810 can be used individually as a beam or as a column as described above.

The building elements according to the present invention have been found through testing to exhibit increased strength in tension (traction), compression and torsion (flexion). For example, a building element 10 having a thickness or caliber of 2 mm was tested in tension and found to have a break load of 2210 kg, a maximum load of 3200 kg, 30.9% elongation, 46.6% narrowing and an ultimate effort to break of 2954 $kg/cm^2$. When tested in compression, a building element 10 having a thickness of 2 mm was found to have a maximum load of 55,000 kg, a slenderness ratio of 7.08 and a crushing percentage of 3.5%. When tested in torsion in the x-x direction, a building element 10 having a thickness of 2 mm had a maximum horizontal shear of 171.57 $kg/cm^2$, a maximum vertical shear of 171.57 $kg/cm^2$, a maximum concentrated load of 6000 kg and a maximum deformation of present invention, it has been found that the building elements of the present invention are as strong as building elements of 30 to 40% more weight. Accordingly, the building elements of the present invention require less weight and, therefore, material, to obtain a desirable strength in tension, compression and/or torsion.

The building elements according to the present invention display enhanced load capacity and resist higher compression and tension forces. The building elements have increased rigidity and stability. The building elements can be formed by bending or shaping metal sheets or pre-formed standard structural members. The building elements can be used individually as beams or columns or can be combined with one or more other building elements to form building element assemblies useable as beam assemblies or column assemblies. Any number of building elements can be combined in a building element assembly. Building elements of different types can be combined in a building element assembly. A single building element can have any number of constrictions, outward protrusions and/or inward protrusions. A building element assembly can be formed by combining similar and/or dissimilar building elements. The building elements of a building element assembly can be secured in position in various ways including attachment of the building elements to one another and/or securement or attachment of the building elements to other structured elements used in the building or other structure in which the building element assembly is installed. Each building element defines a cavity capable of receiving construction components and/or a structural member to be connected to the building element. The building elements can be assembled to define or enclose an interior space capable of receiving construction components such as electrical wiring and/or plumbing. The tips of the building elements can be shaped to provide a mechanical joint or connector facilitating connection of the building elements to one another and/or to various structural members. The mechanical joints or connectors provided by the building elements for structural members, such as wall structures, floor structures, ceiling structures and/or windows, permit elimination of the cracks that normally appear when different materials are joined. The building elements find particular application in construction, expansion and renovation of homes and other buildings. The building elements can be easily placed or installed where needed. The building elements are reasonably priced, minimize waste and reduce construction costs.

It should be appreciated that the present invention is subject to various modifications, variations and changes in detail. Accordingly, the foregoing description of the preferred embodiments should be considered illustrative only and should not be taken in a limiting sense.

What is claimed is:

1. A building element for use as a column or beam, comprising a profile extending lengthwise between first and second ends, said profile having a substantially uniform cross-section defined by a web, a pair of side flanges extending perpendicular to said web, and curved outer corners joining said side flanges to said web, respectively, said web having a constriction, a pair of planar segments disposed on opposite sides of said constriction, respectively, and curved inner corners joining said planar segments, respectively, to said constriction, said constriction extending from said inner corners to a curved base having an apex contained in a plane, said planar segments having outer surfaces, respectively, contained in a plane parallel to said plane of said apex, said side flanges extending from said outer corners, respectively, in the same direction as said constriction to terminate at side edges, respectively, said apex being centrally disposed between said side flanges, said side edges being contained in a plane parallel to said plane of said apex, said building element having an overall width between said plane of said planar segments and said plane of said side edges, said constriction having a width between said plane of said planar segments and said plane of said apex about ⅓ said overall width.

2. A building element as recited in claim 1 wherein said apex is coincident with a central axis of said profile, said central axis being perpendicular to said plane of said planar segments.

3. A building element as recited in claim 2 wherein said building element is symmetrical about said central axis.

4. A building element as recited in claim 3 wherein said inner corners have a radius of curvature, said outer corners have a radius of curvature and said apex has a radius of curvature, said radius of curvature of said outer corners being less than said radius of curvature of said inner corners and said radius of curvature of said apex being less than said radius of curvature of said outer corners.

5. A building element as recited in claim 4 wherein said side flanges are planar between said outer corners and said side edges, respectively.

6. A building element for use as a column or beam, comprising a profile extending lengthwise between first and second ends, said profile having a substantially uniform cross-section defined by a web, a pair of side flanges extending perpendicular to said web to terminate at respective side edges, and curved outer corners joining said side flanges, respectively, to said web, said web having a constriction, a pair of planar segments disposed on opposite sides of said constriction, respectively, and curved inner corners joining said planar segments, respectively, to said constriction, said cross-section being symmetrical about said constriction, said constriction having a pair of arms extending angularly inwardly toward one another from said inner corners, respectively, to a curved base, said arms being joined to said inner corners at junctions, respectively, said base having an apex contained in a plane and being coincident with a central axis of said building element, said planar segments having outer surfaces, respectively, disposed in a plane, said side flanges having planar portions, respectively, perpendicular to said planar segments, said side flanges extending from said outer corners, respectively, in the same direction as said constriction, said side edges being contained in a plane parallel to said plane of said planar segments, said planar portions having outer surfaces, respectively, disposed in planes, respectively, parallel to one another, said apex being disposed midway between said planes of said planar portions, said building element having an overall height between said planes of said planar portions and an overall width between said plane of said planar segments and said plane of said side edges, said constriction having a height between said junctions no greater than ¼ said overall height and a width between said plane of said planar segments and said plane of said apex about ⅓ said overall width.

7. A building element as recited in claim 6 wherein said planar segments have out surfaces disposed in a plane, said apex is disposed in a plane parallel to said plane of said planar segments, said constriction has a width between said plane of said planar segments and said plane of said apex, said width of said constriction is about the same as said height of said constriction.

8. The building element as recited in claim 7 wherein said height of said constriction is about ⅙ said overall height.

9. A building element assembly for use as a column assembly or a beam assembly, comprising a first building element and a second building element assembled in web-to-web relation, each of said first and second building elements including a profile extending lengthwise between first and second ends, said profile having a substantially uniform cross-section defined by a web having a constriction, a pair of planar segments disposed on opposite sides of said constriction, respectively, curved inner corners joining said planar segments, respectively, to said constriction, a pair of side flanges joined to said planar segments, respectively, by curved outer corners, respectively, said side flanges extending perpendicular to said web and terminating at side edges, respectively, said constriction having arms extending angularly inwardly toward one another from said inner corners in the same direction as said side flanges to a curved base having an apex disposed between said planar segments and said side edges, said first and second building elements each having an overall height between said side flanges and an overall width between said planar segments and said side edges, said first and second building elements being secured in assembled relation with said planar segments of said first building element in abutment with said planar segments of said second building element, respectively, to form said building element assembly, said building element assembly having an overall height corresponding to said overall height of said first and second building elements and an overall width corresponding to twice said width of said first and second building elements.

10. The building element assembly as recited in claim 9 wherein said constriction of each of said building elements has a width and said width of said constriction is about ⅓ said overall width.

11. The building element assembly as recited in claim 10 wherein said constriction of each of said building elements has a height and said height of said constriction is no greater than ¼ said overall height.

* * * * *